United States Patent [19]

Betts

[11] Patent Number: 5,067,261
[45] Date of Patent: Nov. 26, 1991

[54] BRUSH GOPHER

[76] Inventor: James G. Betts, Rte. 5 Box 895, Coalgate, Okla. 74538

[21] Appl. No.: 621,852

[22] Filed: Feb. 19, 1991

[51] Int. Cl.$^5$ .............................................. A01G 23/06
[52] U.S. Cl. ..................................... 37/2 P; 172/439; 172/698; 144/34 A
[58] Field of Search ................ 37/2 R, 2 P; 111/101; 172/439, 447, 698, 699; 144/34 R, 34 A, 348

[56] References Cited

U.S. PATENT DOCUMENTS

| 1,420,736 | 6/1922 | Nissrod | 37/2 R |
| 2,309,223 | 1/1943 | Staring | 144/34 A |
| 2,650,063 | 8/1953 | Hawkins | 37/2 R |
| 3,243,904 | 4/1966 | Perry | 144/34 A |
| 3,512,276 | 5/1970 | Juhl | 172/698 |
| 4,356,644 | 11/1982 | Harkness | 37/2 R |

FOREIGN PATENT DOCUMENTS 427175 11/1947 Italy ..................................... 37/2 R Primary Examiner—Dennis L. Taylor
Assistant Examiner—Arlen L. Olsen

[57] ABSTRACT

An invention which is an attachment to a standard tractor for use in continuous clearing, uprooting and grubbing of small trees, stumps, roots and brush from the land. The unit is fabricated of structural steel elements specially designed for continuous cutting and release of targeted materials for removal. These elements, specially designed and new to the art include a safety shield with viewing windows which provides protection to the operator from flying, hazardous debris; a steel bar as a guide to the forward cutting blades which also aids in pushing over the targeted timber; a pair of curved blades for gripping and cutting, then releasing the material they cut and lift without clogging the blades. Also the blades do not stick in the wood. This is a unique property as it allows continual operation including clearing the blades of debris saving the operator time and labor dismounting and manually clearing the blades after each cutting operation. The final improvement over prior art is a curved cutting blade unit at the bottom of the invention which grubs roots, stumps and brush after the cutting and uprooting of timbers allowing the debris to pass through without clogging the blades. This feature saves time and effort by not requiring the operator to dismount after each cutting operation and manually clean the blades of debris.

7 Claims, 1 Drawing Sheet

BRUSH GOPHER

SUMMARY OF THE INVENTION

The Brush Gopher is a tractor attachment adaptable to most standard farm tractors which have a 3-point hook-up and an engine power of 30 to 150 horse power. The Brush Gopher consists of a steel fabricated unit with fixed opposing curved steel blades applied to trees, brush or roots by vehicular motion working in unison with the tractor's hydraulic lift. The Brush Gopher also has a lower three sided blade for root digging and grubbing of trees (six inches or less) stumps, brush and bushes. The main elements comprising the unit are the steel main frame; brush shield; tree guide; angle braces supporting gripper and cutting blades which clutch and grip the targeted material; and the grubber blades.

The major improvements over the prior art are the abilities of the Brush Gopher to push over; hook and clutch the targeted material; dig and root out the targeted material in continuous operation without operator having to dismount and clean blades of material removed at each cutting. The prior art is structurally weaker and does not have the continuous cleaning capability of this machine. Prior art requires constant up and down dismounting which is a great waste of time and effort. The Brush Gopher is more efficient and safer, due to the Brush Shield component.

BRIEF DESCRIPTION OF DRAWINGS

The drawing consists of one sheet with three Figures, FIG. 1, FIG. 2 and FIG. 3.

FIG. 1 LIST OF EMBODIMENTS: (FRONT ELEVATION OF BRUSH GOPHER)

Figure 1:
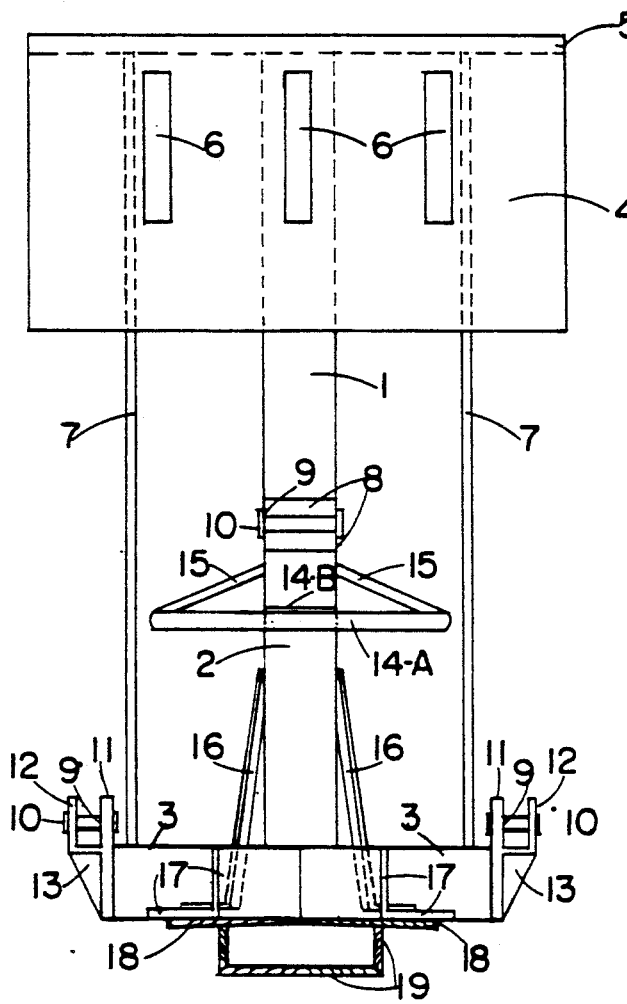
FIG. 1 is the Front Elevation of the Brush Gopher.

1. Structural Steel Main Frame—Top Upright channel section.
2. Structural Steel Main Frame—Bottom Upright angle box section.
3. Structural Steel Main Frame Base angle box section.
4. Brush Shield with equally spaced viewing windows.
5. Steel Rebar Support for the Brush Shield.
6. Viewing window (three equally spaced slots.)
7. Steel Rebar Support for Brush Shield welded to Main Frame Base.
8. Steel Plate welded to Steel Main Frame bottom section with hole drilled. Plate reinforces tractor connection.
9. The 1⅛ dia. hole for receipt of bolt to connect tractor arm connection.
10. High strength 1⅛"-bolt for connecting tractor arm.
11. One inch plate to form lower each of two lower tractor connections.
12. Half-inch side plate attached to Ref. 11 one inch plate.
13. Steel Gusset plate for support of tractor connection housing.
14-A. Tree Guide Rebar.
14-B. Channel Support for connecting Tree Guide to Main Frame Upright.
15. A ¾" Rebar Support connecting ends of Tree Guide to Main Frame.
16. Angle Brace for support of Gripper Blade Mount and connected to forward end of gripper mount and also to Main Frame Upright.
17. Gripper Blade Mount for support of Gripper Cutting Blade.
18. Curved Gripper Blade.
19. Grubber Blade.

FIG. 2 LIST OF EMBODIMENTS: (SIDE ELEVATION IN TARGET APPROACH MODE.)

1. Structural Steel Main Frame—Top Upright channel section.
2. Structural Steel Main Frame
3. Structural Steel Main Frame Base angle box section.
4. Brush Shield.
7. Steel Rebar Support for Brush Shield welded to Main Frame Base.
8. Steel Plate welded to Steel Main Frame bottom section with hole.
9. The 1⅛" dia. hole for receipt of bolt to connect tractor arm.
10. High strength 1⅛-" bolt for connecting tractor arm.
12. Half in. plate to form lower connection for tractor connection.
14-A. Tree Guide Rebar.
14-B. Channel Support for connecting Tree Guide to Main Frame Upright.
15. A ¾" Rebar Support connecting ends of Tree Guide to Main Frame Upright.
16. Angle Brace for support of Gripper Blade Mount and connected to forward ends of gripper mount and also to Main Frame Upright.
17. Gripper Blade Mount for support of Gripper Cutting Blade.
18. Curved Gripper Blade.
19. Grubber Blade.

FIG. 3 LIST OF EMBODIMENTS: (DETAIL OF GRIPPER MOUNT AND GRIPPER BLADES)

2. Structural Steel Main Frame Bottom Upright section cut.
3. Structural Steel Main Frame Base (Top View.)
7. Steel Rebar Support (cut section.)
9. The 1⅛" Dia. hole location (Top View.)
10. High strength 1⅛-" Bolt for connecting tractor arm. (Top View.)
11. One inch plate to form lower tractor connection. (Top View)
12. Half-inch side plate attached to Ref. 11, one inch plate. (Top View.)
17. Gripper Blade Mount for support of Gripper Cutting Blade. (Top View.)
18. Curved Gripper Blade. (Top View.)

DETAILED DESCRIPTION

General Notes: All parts are fabricated from structural steel to meet American Standards Testing Materials A-36 (ASTM A-36) with the exception of the curved Gripper and Grubber Blades which are to meet American Iron and Steel Institute 4130 (AISI-4130) and the Bolts for connection to tractor which are to meet the ASTM A-325. All connections are to meet American Welding Society (AWS) criteria.

BRUSH GOPHER MAIN FRAME—72" tall consisting of top upright section, bottom upright section and base section which is 31" wide. All elements are described below, reference numbers 1 through 19 and as shown on FIG. 1 Front Elevation on attached Drawing 1 of 1. Also FIG. 2 Side Elevation references the same elements with the same reference numbers. FIG. 3 is a detail drawing depicting the top view, looking down, of the Main Frame Base, Gripper Blades as attached to the Gripper Blade Mounts. (Ref. 1, 2 and 3.)

1. Top Upright, 42" long consists of a 6"×2"×¼" steel channel (ASTM A-36.) This element supports the Brush Shield (Ref. 4) and is attached to the Rebar Support (Ref. 5) at top edge of Main Frame Upright (Ref. 2), all connections welded (AWS.)

2. Bottom Upright (center section) consists of a steel box 24" long welded to bottom edge of Top Upright and made up of two (2) 6"×6"×¼" steel angles (ASTM A-36.) The bottom edge is welded to the center top of the Main Frame Base (Ref. 3.) The top of Bottom Upright is welded to bottom of Ref. 1.

3. Main Frame Base is 31" wide and consists of steel channel 6"×6"×¼", two, (ASTM A-36) which form a box, same as Bottom Upright and is welded to the Bottom Upright at centers (Ref. 2.)

BRUSH SHIELD

. A rectangular element 44"×24" used as a viewing, safety shield welded to Top of Upright of Main Frame. This part is welded to Rebar support at top back and two rebars to support sides at back to Main Frame Base and welded at center of Top Upright center (Ref. 4 with elements 5, 6 and 7.)

BRUSH SHIELD

4. A rectangular 44"×24"×¼" thick steel plate (ASTM A-36).

5. Steel Rebar, 1¼" dia. 44" wide welded to top of Brush Shield at back to act as support and stabilizer for the Brush Shield.

6. Three window, viewing slots for sighting targeted trees, brush and bushes to be removed. Each window is 3" down from top of shield and measure 2"×12", centered in shield, 12" apart.

7. Two ¾" thick steel rebars, 65"± long, welded to Ref. 5 Rebar and the Brush Shield (Ref. 4.) The bottom of rebars are welded to Main Frame Base and welded 8" from outer edge on back of Brush Shield for its support. (Ref. 3 and 4.)

UPPER TRACTOR CONNECTION—An ¼" steel plate welded to Main Frame Upright (Ref. 8 to Ref. 2) for support of top tractor connection. (Ref. 8, 9 and 10.)

8. A 6" wide by 4" tall ¼" thick steel plate welded to top of Main Frame Upright (Ref. 2) drilled through each side section with an 1¼" dia. hole to receive bolt for connection to tractor arm connection.

9. Drilled hole 1¼" dia. in ¼" plate (Ref. 8.)

10. High Strength Bolt (ASTM A-325), 1⅛"± for insertion in hole (Ref. 9) to to hold tractor arm connection.

TWO LOWER TRACTOR CONNECTIONS—Connected to ends of Main Frame Base (Ref. 3) containing drilled holes as in Ref. 9, bolts as in Ref. 10 with the addition of three elements of 1" plate, ¼" side support and ¼" steel gusset.

11. Steel Plate, 6"×10"×1" acting as support for each tractor connection at ends of Main Frame Base (Ref. 3.) (Ref. 9, 10, 11, 12 and 13.)

12. Side support, 4"×2½"×¼" thick steel plate welded to 1" steel plate (Ref. 11) that forms the housing for lower tractor connections.

13. Steel Support Gusset, ¼" triangular plate steel welded to side of 1" Steel Plate (Ref. 11) and bottom of ¼" steel plate (Ref. 12) for support of housing connection (Ref. 11 and 12.)

TREE GUIDE—A 24" wide steel rebar with a channel section welded to its midsection and connected to Bottom Upright of Main Frame (Ref. 2), guide also havtwo rebars as support arms connected to ends of Tree Guide and welded to Bottom Upright of Main Frame. The Tree Guide is formed to jut slightly upward and forward to force or push the targeted tree or brush over, up and out of ground giving mechanical advantage to gripper blades at front of unit (Ref. 18.) Ref. 14-A, 14-B and 15.)

TREE GUIDE

14-A. A 1½×24" steel Rebar welded to front side of Bottom Upright of Main Frame by a steel channel (Ref. 14-B) and to end support rebars (Ref. 15) also welded to Bottom Upright, Main Frame (Ref. 2.)

14-B. A 2"×6" steel channel support connected to center of Tree Guide Rebar (Ref. 14-A) and Bottom Upright of Main Frame (Ref. 2.)

A ¾" Steel Rebar Support connected to each end of Tree Guide (Ref. 14-A) and also connected to Bottom Upright of Main Frame (Ref. 2), all with welded connections (AWS.)

ANGLE BRACES to support the Gripper Blade Mounts and Gripper Blades (Ref. 17 and 18) and welded to Bottom Upright of Main Frame (Ref. 2.)

16. Angle brace consists of 3"×2"×5/16" steel angle welded each end to Bottom Upright of Main Frame (Ref. 2) and outer side of Gripper Blade Mount at its forward end (Ref. 17) at 45° angle.

GRIPPER BLADE MOUNT is a support for the Gripper Blades (Ref. 18) and is made up of a 6"×6"×¼" angle 25" long connected at center of Base Main Frame, slotted through box and welded to angle brace at forward end as a support for the Gripper Blade which is welded to bottom side of Gripper Mount. (Ref. 17.)

17. A 6"×6"×¼" steel angle, 24" long which serves as a mount for the Gripper Blades. This angle is welded on its bottom surface to (Ref. 18) Gripper Cutting Blade and angled through the Main Frame Base (Ref. 2) in fixed position. The Gripper Mount is sharpened on front 6" edge and along 12" of top edge of channel ¼" surface. This gives added capability to hooking and gripping of targeted material to be removed.

GRIPPER CUTTING BLADE is made of steel grader blade curved upward and attached to Gripper Mount (Ref. 17) on its top surface for fixed position and support. The Gripper cutting blades clutch and hook into targeted material (Ref. 18.)

18. A 6"×22"×⅜" curved, fixed cutting blade (made of grader blade) AISI-4130 hardened steel. The curved blade is a ¼" radius each side of 6" width (front end) and sharpened along the 6" edge and inner edges of 22" length. The blade is welded on its upper surface to Gripper Mount with ends and inner surfaces of Gripping Cutting Blades extending out by 2" from ends and inner sides of Gripper Mounts (Ref. 17.) Also note the curved blade is shaped to resemble a saucer shape with the cutting sharpened 22" length edge curving upward. Front inner edges are 11" apart.

The Gripper Cutting Blades' curved edge cut into, scoop, and release timber when blade is withdrawn by tractor's forward movement, releasing targeted material, allowing continuous cutting without dismounting to clean targeted material off blades. This automatic release of removed material is a great time and labor saving quality over prior art.

Figure 2:
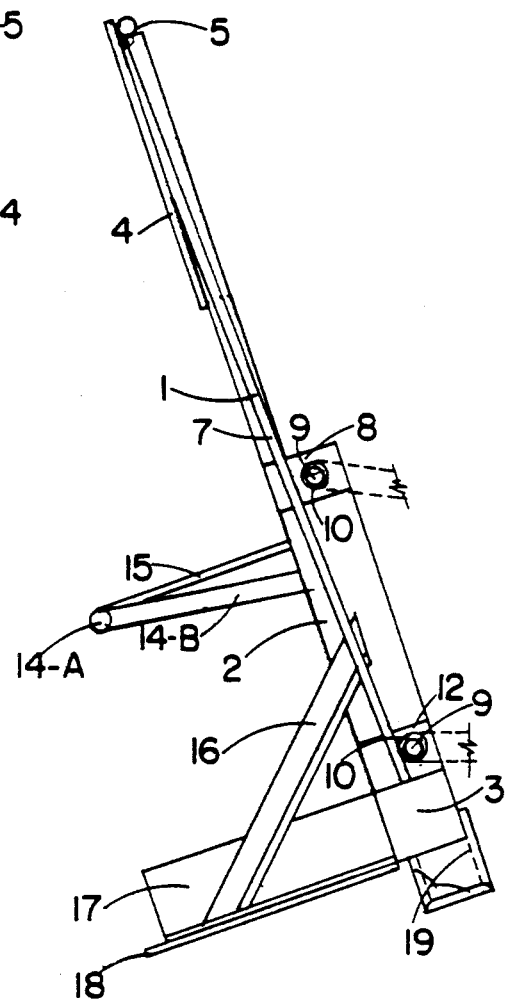
FIG. 2 is the Side Elevation of the Brush Gopher and
FIG. 3 is a detail drawing of the Gripper Blades attached to the Main Frame Base. All parts of structural steel.
Figure 3:
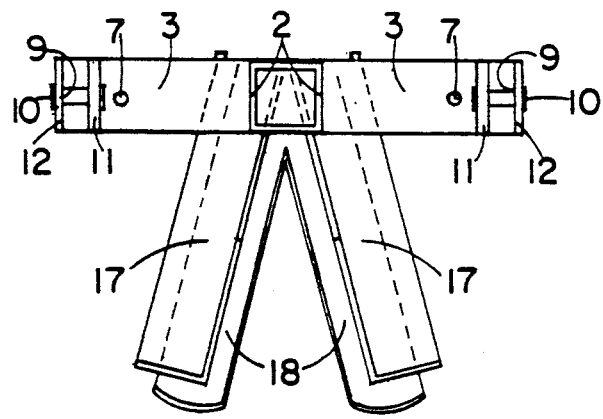

GRUBBER BLADE is a threepieced blade unit shaped like a "⊔" and welded to the back side and bottom of the Main Frame Base (Ref. 3, FIG. 1 and 2.) This blade unit is made up of Grader Blade (AISI-4130). The Blade uprights are 4½"×6" solid plates with concave shape, 11" apart at front side and 12" apart at back side of blade unit. The bottom blade is a concave blade with sharpened edge downward. The space between all blades is an open space allowing for dirt, and debris to pass through without clogging, thus giving a continuous operation and release of cleared and grubbed materials.

19. Grubber Blade Unit is a three pieced blade unit with two blades 4½" ×6"×⅜" concave solid plate blades welded to the bottom 6"×⅜" blade which is 12"± on front side and 13"± on rear or back side, all welded to Main Frame Base (Ref. 3) at center. All blades are concave, with bottom blade curved down, sharpened on front and back edges. The two upright blades are concave with front and back edges sharpened. The Grubber Blade Unit has six sharpened edges, all blades of ⅜" Steel (AISI-4130) or similar to and equal to grader blades.

The Grubber Blades root out trees and stumps (6" dia. or less), bushes and brush with downward movements easily releasing the removed material.

The following denotes advantages and unique features of the Brush Gopher, attachment for a standard tractor.

The Overall Operation of the Brush Gopher is a continuous clearing and grubbing operation with automatic debris release requiring no dismounting and cleaning of blades after each cutting operation. There is no build-up or clogging of removed material as it is cut and removed. The gripper blades clutch, cut and release the targeted material as tractor moves unit forward in continual operation. The grubber blade unit aids this automatic clearing and release by the unique design/invention of the three piece blade unit. The prior art "Tree Puller" is made of square tubular steel units which is a weaker Main Frame Structure and it requires continuous dismounting to clean blades after each cutting operation. The "Brush Gopher", thus provides a major savings in time and labor cost.

Main Frame and Parts are of structural steel members meeting ASTM A-36 making for a stronger and lasting unit. Prior art "Tree Puller" is of square tubular steel material lacking the structural strength of the Brush Gopher.

Brush Shield is a steel safety shield with viewing windows, three equally placed in shield for clear sighting of targeted material. The prior art does not have this feature. The Brush Shield deflects hazardous debris from hitting the operator in face or body.

Tree Guide gives operator capability of guiding and pushing targeted timber in a selected direction, guiding the fixed Gripper Cutting Blades to grasp or clutch the targeted material. This is a structural steel rebar strongly welded to main frame. Prior art does not have this feature.

Gripper Cutting Blades are steel curved blades fixed to gripper mounts connected to Angle Braces. The curved up gripper blades clutch and cut the targeted timber and automatically release the removed material through the vehicular motion and in unison with the tractor's hydraulic lift as the unit moves forward for continuous operation. There is no stopping the tractor and Brush Gopher to dismount and clean the blades as is necessary in the prior art "Tree Puller." The forward movement of the Brush Gopher cuts with the Gripper Blades at the same time releasing the blades from targeted material, thus no clogging of blades as in prior art. The Gripper Blades are a unique invention designed by the Inventor for more efficient, clean and cost saving operations. The Gripper Blades to not stick in the wood.

Grubber Cutting Blade Unit is a unique invention, improvement over prior art. The 3 piece blade unit is concave in shape and bottom blade is wider in back than in front with side upright blades spaced 11" apart in front and 12" in back, also concave, allowing a clear space for grubbed material to pass through with no clogging of the blades. This feature is an improvement over prior art in that the grubbed or dragged material is automatically released. The debris falls away from the blades and allows for continual operation in unison with the gripper blades. There is no dismounting to manually clear the blades of debris as is the case in the prior art.

We claim:

1. A device for clearing land of brush, roots, trees and stumps comprising:
    a main frame having means for attachment of said main frame to a vehicle;
    a plurality of tines extending from a lower portion of said main frame, having blade means thereon for penetrating soil to remove material from the soil, wherein said blades means have an upper cutting portion extending along the length of said tines and a lower cutting portion attached to the bottom of said upper cutting portion to form an opening whereby soil is allowed to pass therethrough;
    guide means, connected to said main frame, for assisting in removal of said material; and
    a protective shield connected to said main frame.

2. The device for clearing land of claim 1, wherein said protective shield further comprises a plate having a plurality of windows therethrough, wherein said windows are substantially smaller than said plate for viewing the material being removed from the soil.

3. The device for clearing land of claim 1, wherein said guide means is a bar supported on said main frame by a plurality of supports.

4. The device for clearing land of claim 1, wherein said means for attachment is a three-point hitch.

5. A device for clearing land of brush, roots, trees and stumps comprising:
    a main frame having means for attachment of said frame to a vehicle;
    blade means, rigidly connected to and extending from a lower portion said main frame, for penetrating soil to remove material from the soil;
    guide means, connected to said main frame, for assisting in removal of said material; and
    a protective shield plate, connected to said main frame, having a plurality of windows therethrough, wherein said windows are substantially smaller than said plate for viewing the material being removed from the soil.

6. The device for clearing land of claim 5, wherein said guide means is a bar supported on said main frame by a plurality of supports.

7. The device for clearing land of claim 5, wherein said means for attachment is a three-point hitch.

* * * * *